(12) United States Patent  (10) Patent No.: US 9,392,899 B2
Fung et al.  (45) Date of Patent: Jul. 19, 2016

(54) TEMPERATURE SENSING AND CONTROL SYSTEM FOR A COOKING APPLIANCE

(71) Applicants: Kam Fai Fung, Hong Kong (CN); Kin Man Lai, Hong Kong (CN)

(72) Inventors: Kam Fai Fung, Hong Kong (CN); Kin Man Lai, Hong Kong (CN)

(73) Assignee: CONAIR CORPORATION, Stamford, CT (US)

( * ) Notice: Subject to any disclaimer, the term of this patent is extended or adjusted under 35 U.S.C. 154(b) by 240 days.

(21) Appl. No.: 13/957,753

(22) Filed: Aug. 2, 2013

(65) Prior Publication Data

US 2015/0037482 A1  Feb. 5, 2015

(51) Int. Cl.
*A47J 37/06* (2006.01)
*A47J 27/62* (2006.01)

(52) U.S. Cl.
CPC .............. *A47J 27/62* (2013.01); *A47J 37/0611* (2013.01); *A47J 2037/0617* (2013.01)

(58) Field of Classification Search
CPC ................ A47J 37/0611; A47J 2037/0617
USPC .................. 99/378, 372, 379, 337, 344, 342
See application file for complete search history.

(56) References Cited

U.S. PATENT DOCUMENTS

| | | | |
|---|---|---|---|
| 2,033,060 A | 3/1936 | Anderson | |
| 2,057,501 A | 10/1936 | Parr | |
| 2,607,287 A | 8/1952 | Price | |
| 2,719,903 A | 10/1955 | Oertli | |
| 4,036,995 A | 7/1977 | Koether et al. | |
| 4,088,067 A | 5/1978 | Kaebitzsch et al. | |
| 4,206,345 A | 6/1980 | Maass et al. | |
| 4,697,504 A | 10/1987 | Keating | |
| 5,237,914 A | 8/1993 | Carstensen | |
| 5,467,696 A | 11/1995 | Everhart | |
| 5,531,155 A | 7/1996 | Pellicane et al. | |
| 5,712,466 A | 1/1998 | Spicer | |
| 5,758,568 A | 6/1998 | Moravec | |
| 5,848,567 A | 12/1998 | Chiang | |
| 5,992,302 A | 11/1999 | Geisler | |
| 6,012,380 A * | 1/2000 | Hermansson ....... | A47J 37/0611 99/337 |
| 6,062,130 A | 5/2000 | Brady | |
| D436,498 S | 1/2001 | Carlson et al. | |
| 6,389,959 B1 | 5/2002 | Robertson | |
| 6,439,108 B1 | 8/2002 | Wu | |
| RE37,988 E | 2/2003 | Uss | |
| 6,539,842 B1 | 4/2003 | Chapman et al. | |
| 6,591,740 B1 | 7/2003 | Hsu | |
| 6,595,115 B1 * | 7/2003 | Lin ............................... | 99/342 |
| 6,595,116 B1 | 7/2003 | Lin | |
| 6,615,706 B1 * | 9/2003 | Wu ............................... | 99/331 |
| 6,705,306 B1 | 3/2004 | Dickey | |
| 7,514,655 B2 | 4/2009 | Fernandez et al. | |
| 7,608,803 B2 | 10/2009 | Jerovsek | |
| 7,717,028 B2 | 5/2010 | Serra | |
| 8,122,816 B2 | 2/2012 | Yu | |
| 8,261,657 B2 | 9/2012 | Serra et al. | |
| 8,372,459 B2 * | 2/2013 | Owensby .................. | A23L 1/01 426/231 |
| 8,609,168 B2 * | 12/2013 | Ceravalls Pujol et al. .... | 426/231 |
| 2004/0074398 A1 | 4/2004 | Griffin et al. | |
| 2005/0139086 A1 | 6/2005 | McHutchison | |
| 2009/0165774 A1 | 7/2009 | Johnston et al. | |
| 2012/0137897 A1 | 6/2012 | Tahincioglu | |

* cited by examiner

*Primary Examiner* — Reginald L Alexander
(74) *Attorney, Agent, or Firm* — Grogan, Tuccillo & Vanderleeden, LLP

(57) ABSTRACT

A cooking appliance includes an upper housing having a first heating plate, a lower housing having a second heating plate, and a temperature probe extending through one of the first heating plate and the second heating plate for detecting an internal temperature of a food item.

13 Claims, 6 Drawing Sheets

United States Patent US 9,392,899 B2

TEMPERATURE SENSING AND CONTROL SYSTEM FOR A COOKING APPLIANCE

FIELD OF THE INVENTION

The present invention relates to cooking appliances and, more particularly, to an improved temperature sensing and control system for a cooking appliance.

BACKGROUND OF THE INVENTION

Cooking appliances, and in particular electric cooking/grilling devices such as griddles, are known. These grilling devices typically have a lower housing having a lower cooking surface and an upper housing having an upper cooking surface, wherein the cooking surfaces are typically heated by an electrical resistance heater. A handle attached to the upper housing allows a user to raise and lower the upper housing relative to the lower housing to accommodate a food item therebetween to be heated.

While existing grilling devices are generally suitable for what is regarded as ordinary performance, there is room for improvement in terms of convenience, ease of use and increased functionality. As will be readily appreciated, to determine the temperature or doneness of food items, typical grills require a user to open the grill and pause cooking in order to insert a thermometer. In view the tedious nature of this process, there is a need for a cooking appliance that includes a means for measuring the doneness of food items during cooking.

SUMMARY OF THE INVENTION

It is an object of the present invention to provide a cooking appliance having an improved temperature sensing and control system.

It is another object of the present invention to provide a cooking appliance having an integral temperature probe for detecting the temperature of a food item during cooking.

These and other objects are achieved by the present invention.

According to an embodiment of the present invention, a cooking appliance includes an upper housing having a first heating plate, a lower housing having a second heating plate, and a temperature probe extending through one of the first heating plate and the second heating plate for detecting an internal temperature of a food item.

According to another embodiment of the present invention a cooking appliance is provided. The cooking appliance includes a first heating surface for contacting a food item to be heated and a temperature sensing probe. The temperature sensing probe is selectively extendable from the first heating surface to penetrate the food item for detecting an internal temperature of the food item.

According to another embodiment of the present invention, a method of operating a cooking appliance is provided. The method includes the steps of providing an upper housing having an upper heating plate and a lower housing having a lower heating plate, and equipping the cooking appliance with a temperature probe, the temperature probe being selectively extendable through the lower heating plate.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
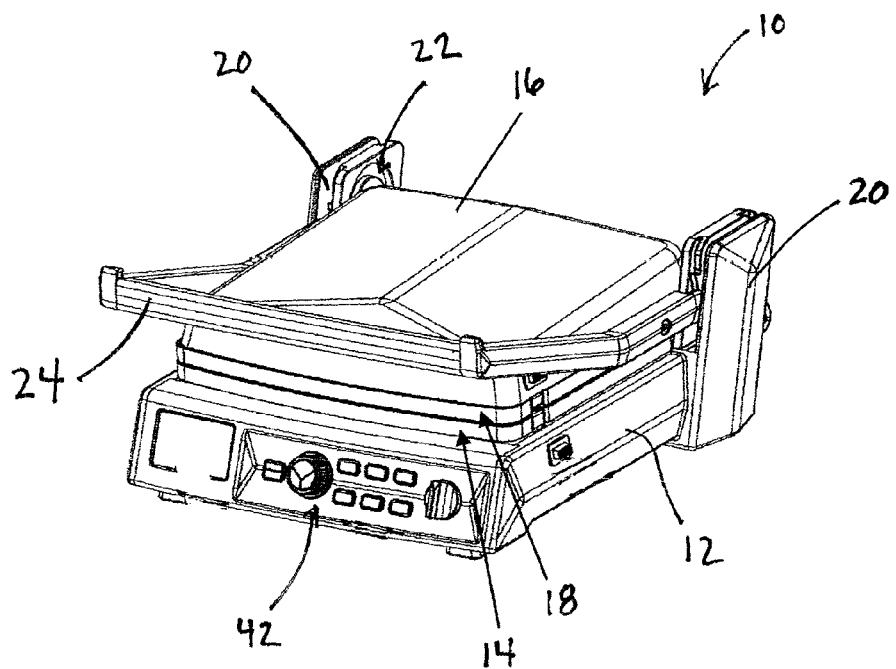
FIG. 1 is a perspective front view of a cooking appliance in accordance with an embodiment of the present invention.
Figure 2:
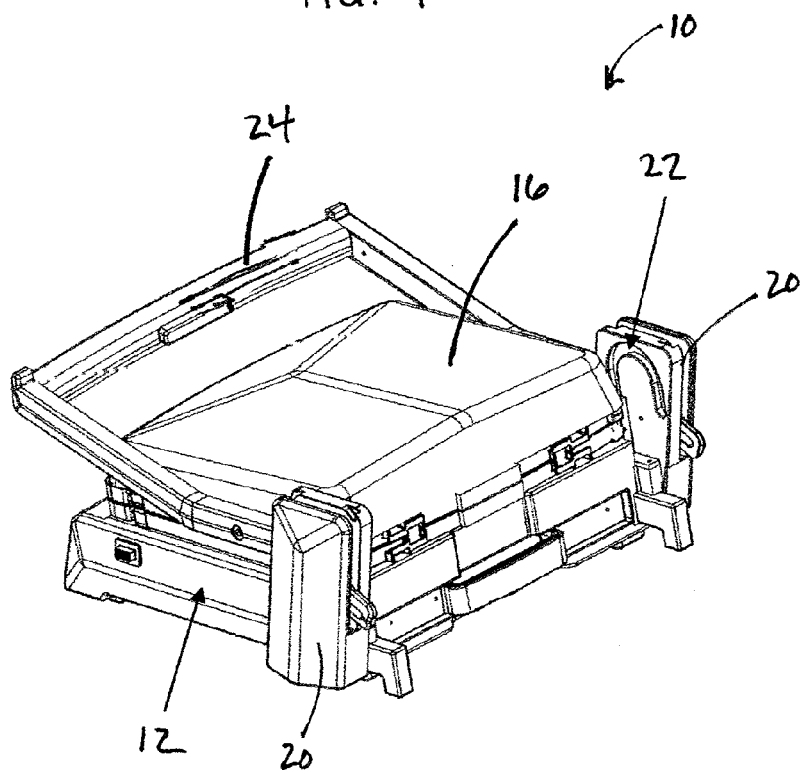
FIG. 2 is a perspective rear view of the cooking appliance of FIG. 1.

Referring to FIGS. 1 and 2, a cooking appliance 10 according to an embodiment of the present invention is shown. As shown therein, the cooking appliance 10 generally takes the form of a countertop grill and includes a lower housing 12 having a lower heating/cooking plate 14 and an upper housing 16 having an upper heating/cooking plate 18. The upper housing 16 is operatively connected to the lower housing 12 via opposed frame members 20 extending from the lower housing 16. In particular, as shown therein, the upper housing 16 rides in a guide track 22 in the frame members 20. A handle 24 attached to the upper housing 16 allows a user to raise and lower the upper housing 16 in the guide track 22 in order to selectively position the upper housing 16 in various positions in relation to the lower housing 12.

Figure 3:
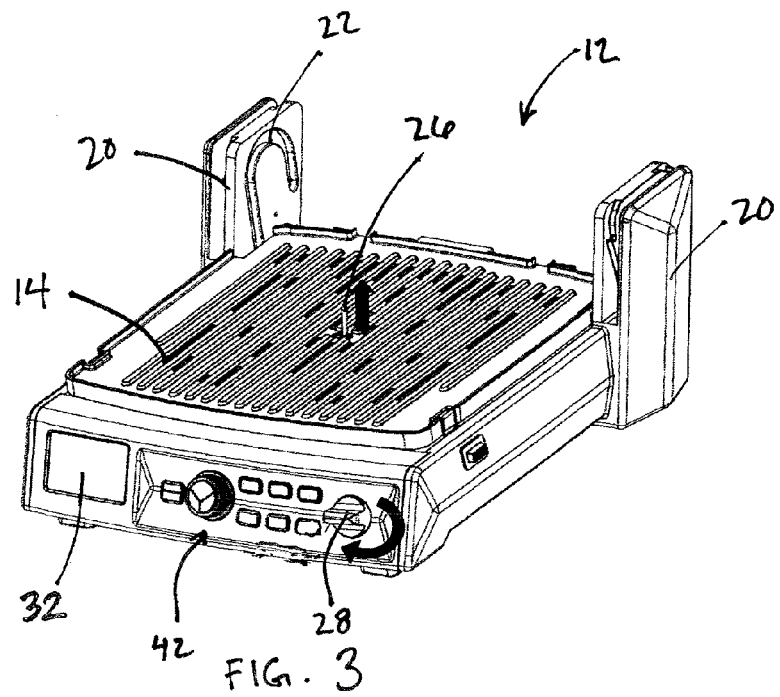
FIG. 3 is a perspective view of the lower housing of the cooking appliance of FIG. 1.
Figure 4:
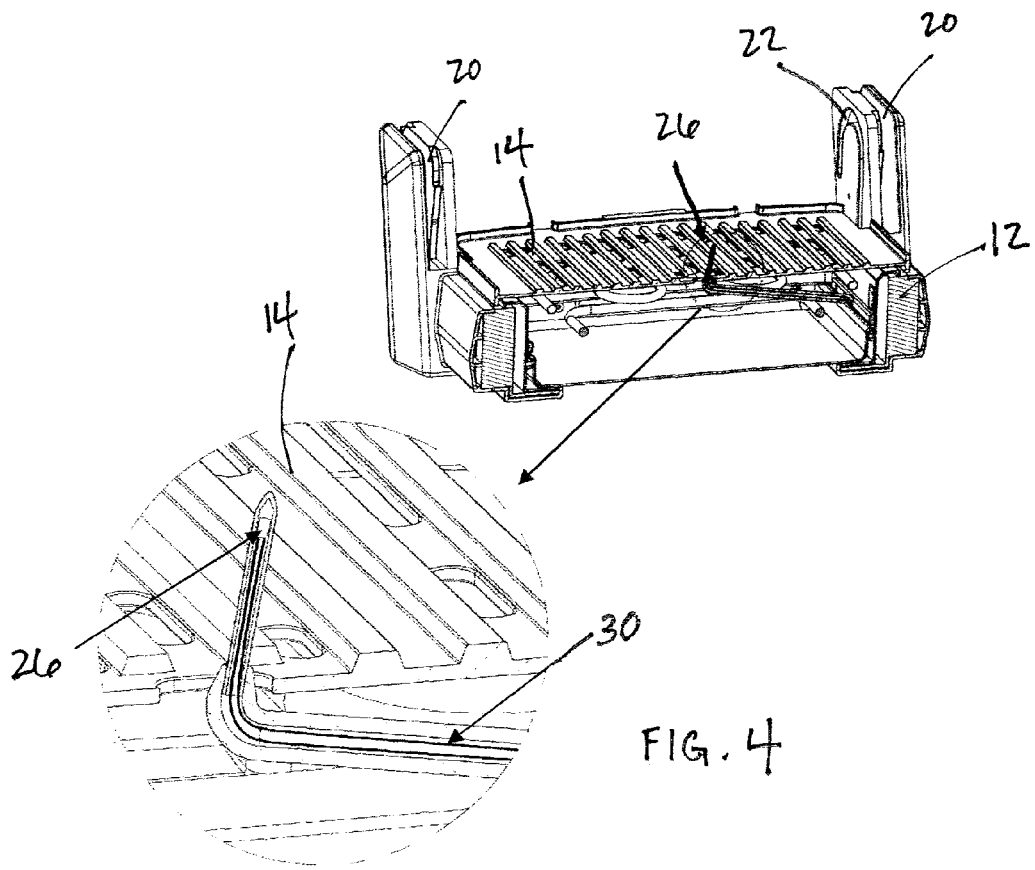
FIG. 4 is a perspective, cross-sectional view of the lower housing of the cooking appliance of FIG. 1.
Figure 5:
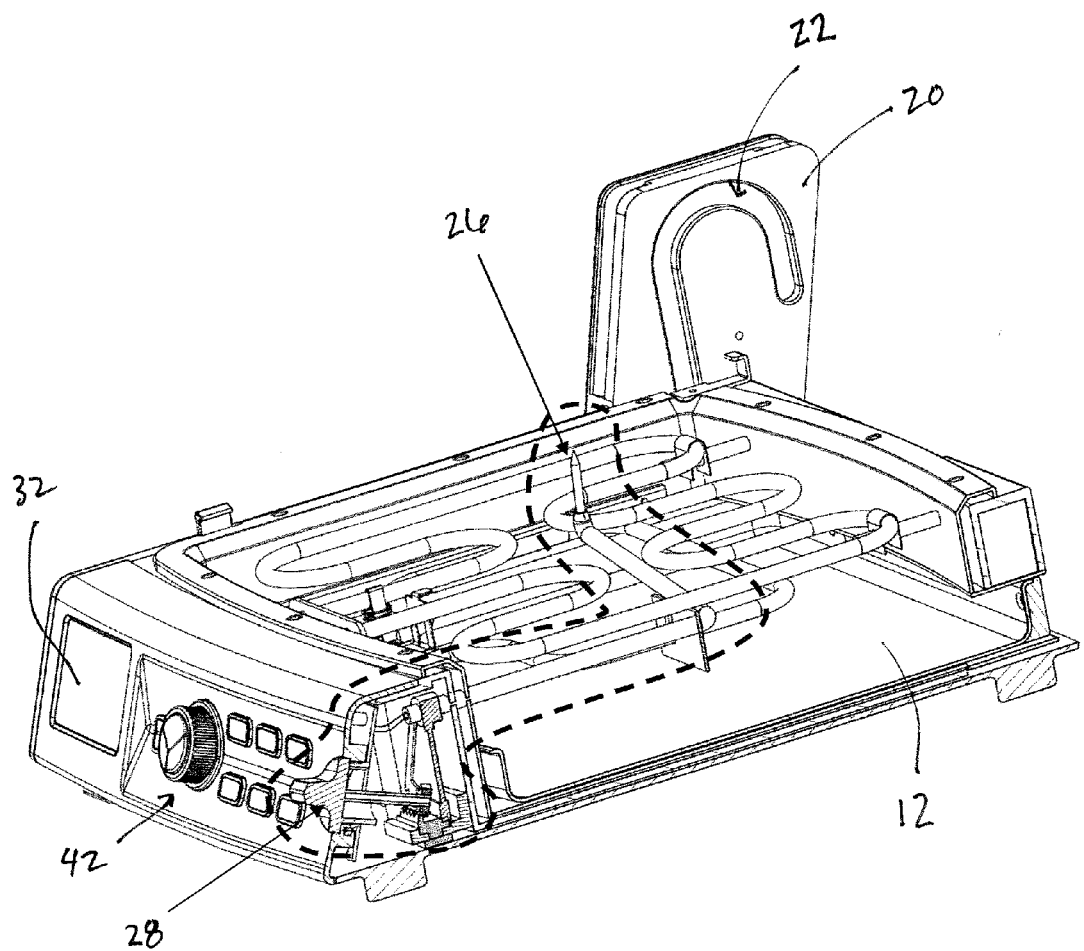
FIG. 5 is another perspective, cross-sectional view of the lower housing of the cooking appliance of FIG. 1.

With reference to FIGS. 3-5, the grill 10 includes a temperature sensing probe 26 that extends through an aperture in the center of the lower heating plate 14. The temperature sensing probe 26 is operatively connected to a rotatable knob 28 that enables a user to selectively extend or retract the probe 26 from the lower heating plate 14, as discussed in detail below. In particular, in operation, a user can rotate the knob 28 to extend the temperature sensing probe 26 from the lower heating plate 14 such that the probe 26 pierces a food item placed on the lower heating plate 14. The probe 26 is electrically coupled via an electrical wire 30 or similar means to a control unit having a printed circuit board (PCB) and LCD 32 or other output means to indicate to a user when the desired temperature or doneness of a food item has been reached, as best shown in FIGS. 4 and 5.

Figure 6:
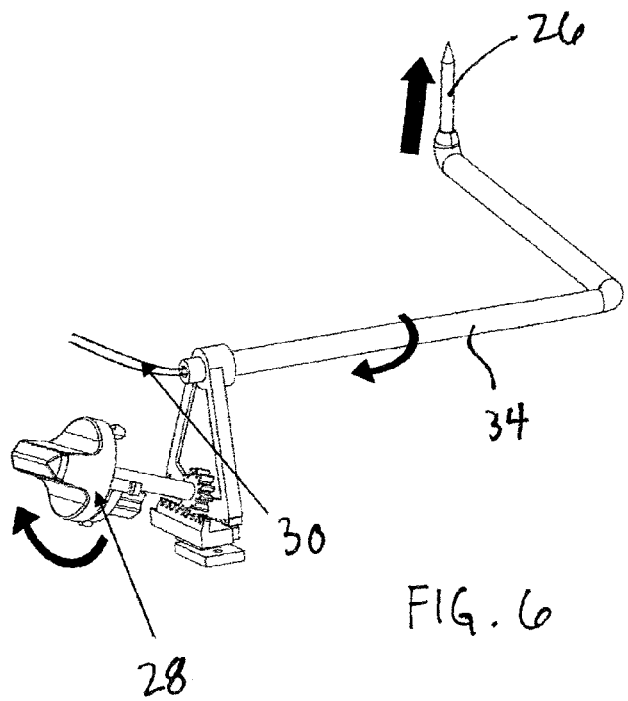
FIG. 6 is a perspective view of a temperature sensing probe of the cooking appliance of FIG. 1.
Figure 7:
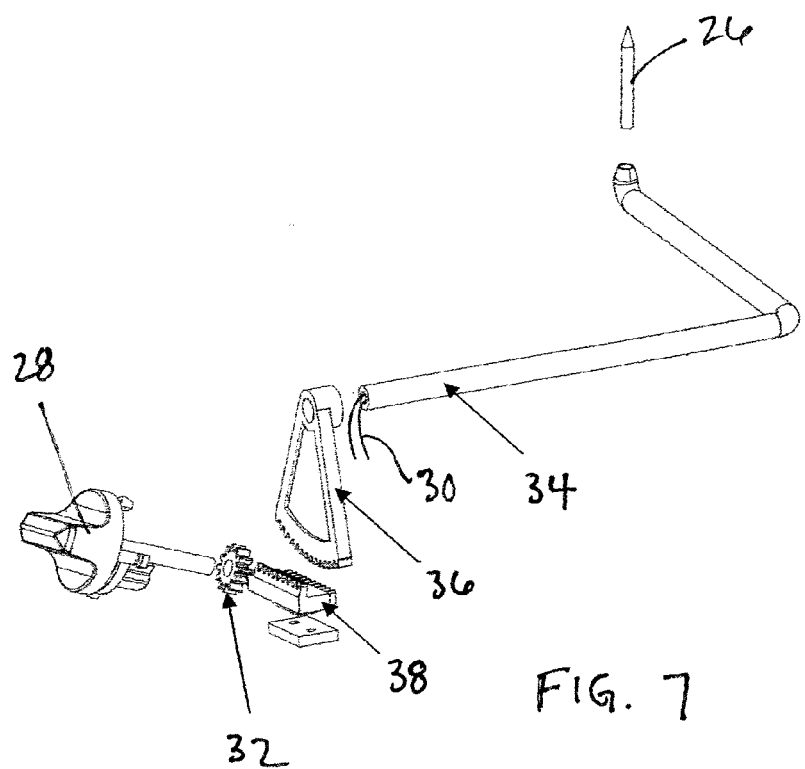
FIG. 7 is an exploded view of the temperature sensing probe of FIG. 6.

Turning now to FIGS. 6 and 7 the connection between the temperature sensing probe 26 and adjusting knob 28 is shown. The knob 28 includes a shaft on which is mounted a first gear 32. The probe 26 is connected to a hollow shaft 34, within which the electrical wire 30 is housed, and on which a second gear 36 is mounted. The first and second gear 32, 36 are interconnected through a rack 38 such that rotation of the knob 28 causes corresponding rotation of the shaft 34, which effects vertical extension and retraction of the temperature sensing probe 26, as best shown in FIG. 6.

Figure 8:
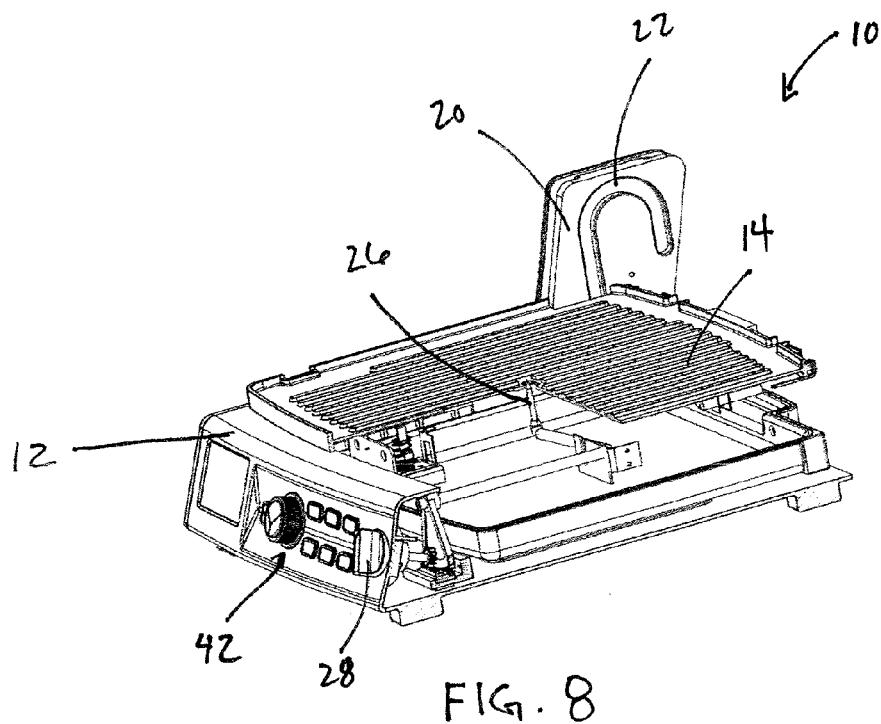
FIG. 8 is a perspective, partial cross view of the lower housing of the cooking appliance of FIG. 1, illustrating the temperature sensing probe in a retracted position.
Figure 9:
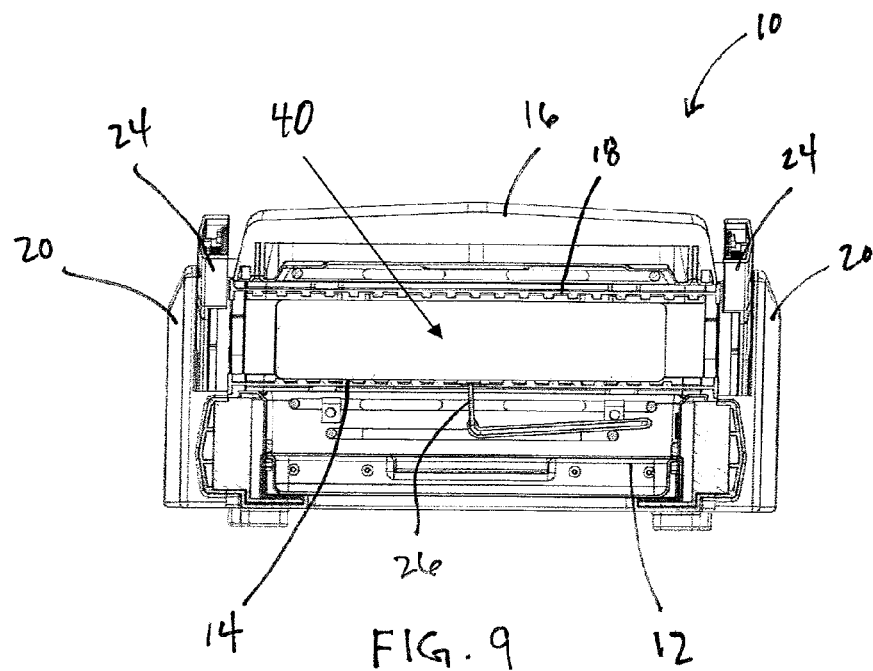
FIG. 9 is a rear, cross-sectional view of the cooking appliance of FIG. 1, illustrating the temperature probe in a retracted position below a food item.

With reference to FIGS. 8-11, in operation, after a user places a food item 40 on the lower heating plate 14, the upper heating plate 18 may be closed for double side grilling. In this position, the temperature sensing probe 26 is in its retracted position, below the lower heating plate 14, as shown in FIGS. 8 and 9. In this position, the probe 26 does not pierce or penetrate the food item 40.

Figure 10:
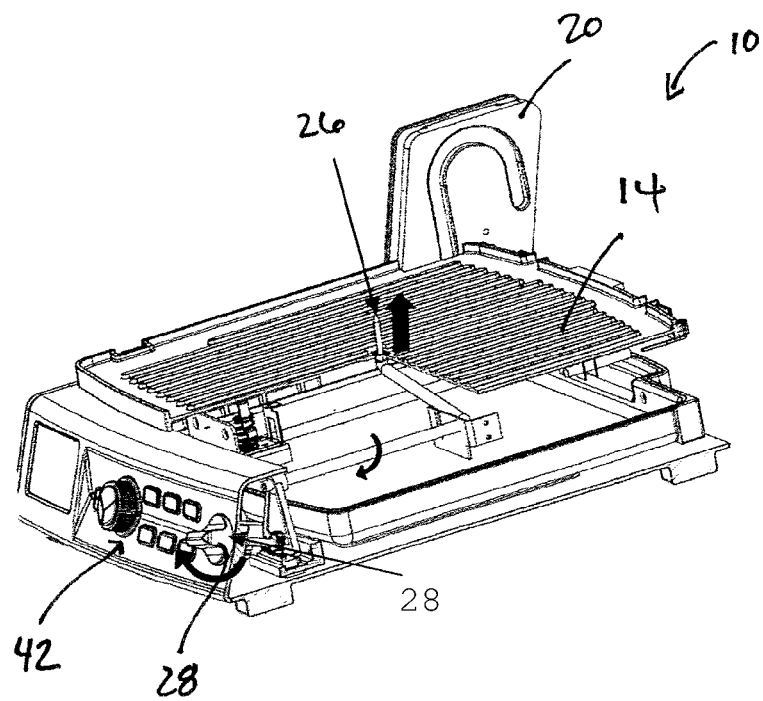
FIG. 10 is a perspective, partial cross view of the lower housing of the cooking appliance of FIG. 1, illustrating the temperature sensing probe in an extended position.
Figure 11:
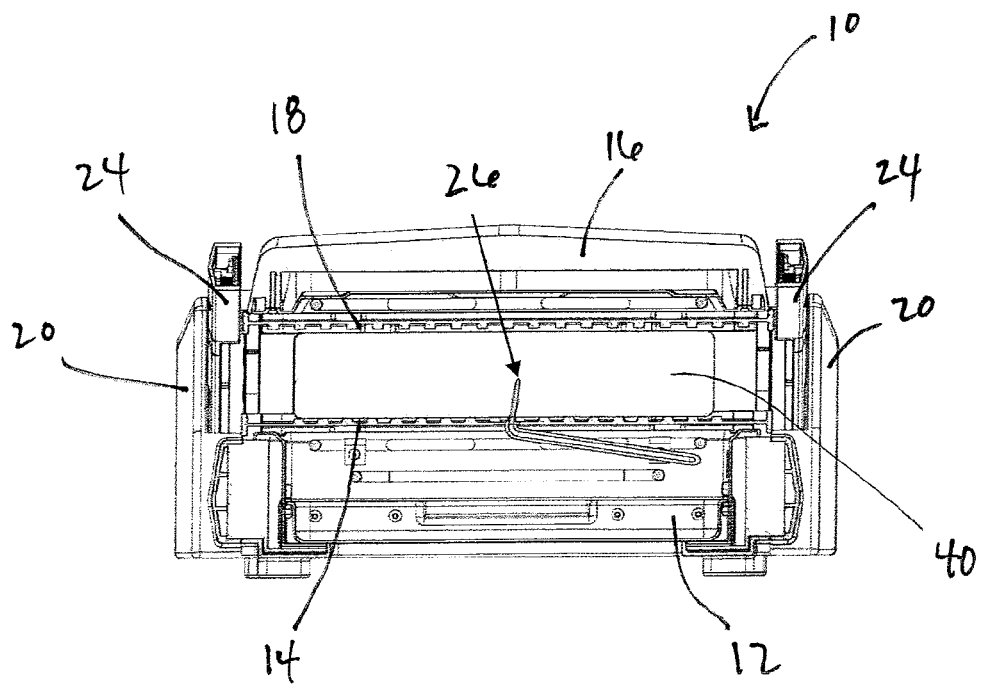
FIG. 11 is a rear, cross-sectional view of the cooking appliance of FIG. 1, illustrating the temperature probe in an extended position within a food item.

As shown in FIGS. 10 and 11, the knob 28 may then be rotated in order to extend the probe 26 such that it pierces and penetrates the food item 40. As will be readily appreciated, as different food items have different thicknesses, requiring differing depths of food piercing to most accurately determine the doneness of such food items, the knob 28 also allows a user to adjust the piercing depth so that a precise doneness or temperature of the food item 40 can be determined.

Importantly, in the preferred embodiment, the cooking appliance 10 includes a control system that allows a user to precisely control the degree of doneness or temperature of food items. In particular, the control system includes the temperature sensing probe 26 and the control unit, as described above, as well as a control panel 42 on the cooking appliance 10. The control panel 42 includes an array of buttons that allow a user to select and set a variety of cooking or heating parameters. For example, a user can select a desired internal temperature of the food item to be cooked, or a desired degree of doneness. The control unit is configured to control operation of the one or both of the heating plates 14, 18 in dependence upon the preset cooking or heating parameters, and in dependence upon the temperature of a food item detected by the temperature sensing probe 26.

In particular, in operation, a user can select a desired degree of doneness (e.g., rare, medium, well done) utilizing the control panel 42 on the lower housing 12. Throughout the cooking or heating process, the temperature sensing probe 26 continuously or intermittently monitors the internal temperature of the food item and sends a signal to the control unit that is indicative of the detected temperature. When the temperature sensing probe 26 detects the pre-set temperature, or a temperature corresponding to the desired degree of doneness as set by a user, the control unit automatically turns off the heating plates 14, 18 to prevent overcooking. In addition, after the desired temperature is reached, the control unit is configured to generate an audible alert, such as a beep, to indicate to a user that the food item 40 is cooked to the desired doneness.

As will be readily appreciated, the cooking appliance 10 of the present invention therefore provides a level of control over the cooking or heating operations that has heretofore not been possible with existing devices. In particular, the configuration of existing cooking appliances typically requires that a user manually insert a meat thermometer into a food item and manually monitor the temperature of the food item. By automatically monitoring the internal temperature of the food throughout cooking, and controlling operation of the cooking appliance in dependence upon pre-set and detected temperatures, more precise cooking, and therefore better tasting food, is realized. In addition, the cooking appliance 10 of the present invention provides a greater level of convenience by automatically monitoring the internal temperature of a food item without constant attention by a user.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A cooking appliance, comprising:
an upper housing having a first heating plate;
a lower housing having a second heating plate;
a temperature probe extending through one of said first heating plate and said second heating plate for detecting an internal temperature of a food item;
a moving mechanism operatively connected to said temperature probe for selectively moving said temperature probe between a first position, in which said temperature probe extends through one of said first heating plate and said second heating plate, and a second position, in which said temperature probe is retracted and does not extend through either of said first heating plate and said second heating plate; and
wherein said moving mechanism is a rotatable knob operatively connected to said temperature probe and configured to control movement of said temperature probe between said first position and said second position.

2. The cooking appliance of claim 1, further comprising:
a control unit electrically coupled to said temperature probe.

3. The cooking appliance of claim 2, wherein:
said control unit is configured to deactivate said first and second heating plates when a preset temperature is reached.

4. The cooking appliance of claim 2, wherein:
said control unit is configured to generate an audible alert when a preset temperature is reached.

5. The cooking appliance of claim 2, wherein:
said temperature probe is selectively extendable from said second heating plate via operation of said moving mechanism.

6. The cooking appliance of claim 1, further comprising:
a control panel having a plurality of controls for allowing a user to select a desired cooking temperature.

7. The cooking appliance of claim 2, wherein:
said control unit is configured to control operation of at least one of said first and said second heating plates in dependence upon said internal temperature of said food item detected by said temperature probe.

8. A cooking appliance, comprising:
a first heating surface for contacting a food item to be heated;
a temperature sensing probe, said temperature sensing probe being selectively extendable through said first heating surface to penetrate said food item for detecting an internal temperature of said food item;
a means for extending and retracting said temperature sensing probe from said first heating surface, whereby in a retracted position said probe does not extend past said first heating surface; and
wherein said means for extending and retracting said temperature sensing probe is a rotatable knob.

9. The cooking appliance of claim 8, further comprising:
an control panel having one or more input buttons for allowing a user to select at least one input parameter, said at least one input parameter including a desired internal temperature of said food item.

10. The cooking appliance of claim 9, further comprising:
a control unit electrically coupled to said temperature probe and said control panel, said control unit being configured to control operation of said first heating surface in dependence upon said at least one input parameter and said internal temperature of said food item detected by said temperature sensing probe.

11. The cooking appliance of claim 9,
said control unit is configured to deactivate said first heating surface when said desired internal temperature is reached.

12. The cooking appliance of claim 9, wherein:
said control unit is configured to generate an audible alert when said desired internal temperature is reached.

13. The cooking appliance of claim 8, further comprising:
a second heating surface operatively connected to said first heating surface and configured to selectively contact said food item to be heated.

\* \* \* \* \*